United States Patent
Utsumi

(10) Patent No.: US 9,742,941 B2
(45) Date of Patent: Aug. 22, 2017

(54) INFORMATION PROCESSING APPARATUS, METHOD FOR CONTROLLING INFORMATION PROCESSING APPARATUS, AND RECODING MEDIUM REGARDING RETURNING FROM A POWER SAVING STATE

(71) Applicant: CANON KABUSHIKI KAISHA, Tokyo (JP)

(72) Inventor: Yuichi Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/634,234

(22) Filed: Feb. 27, 2015

(65) Prior Publication Data
US 2015/0249767 A1    Sep. 3, 2015

(30) Foreign Application Priority Data
Mar. 3, 2014 (JP) .................... 2014-040141

(51) Int. Cl.
*G06K 15/00*     (2006.01)
*H04N 1/00*     (2006.01)

(52) U.S. Cl.
CPC ..... *H04N 1/00551* (2013.01); *H04N 1/00588* (2013.01); *H04N 1/00689* (2013.01); *H04N 1/00734* (2013.01); *H04N 1/00755* (2013.01); *H04N 1/00779* (2013.01); *H04N 1/00896* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,227,831 A | * | 7/1993 | Miyazaki ............... | G02B 7/102 396/213 |
| 5,371,561 A | * | 12/1994 | Sato ....................... | G03B 17/24 355/40 |
| 6,409,043 B1 | * | 6/2002 | Fujita ..................... | B65H 5/24 271/10.03 |

(Continued)

FOREIGN PATENT DOCUMENTS

| | | |
|---|---|---|
| CN | 1551004 A | 12/2004 |
| CN | 102234036 A | 11/2011 |
| JP | 2006243238 A | 9/2006 |

*Primary Examiner* — Miya J Williams
(74) *Attorney, Agent, or Firm* — Canon U.S.A., Inc. IP Division

(57) ABSTRACT

An information processing apparatus includes a light emitting unit and a light receiving unit for receiving light output from the light emitting unit, and includes a detection unit for outputting a light reception signal indicating that the light receiving unit has received light from the light emitting unit, a driving signal output unit for outputting a driving signal to the detection unit so that the light emitting unit intermittently outputs light, a detection signal output unit for outputting, based on the output driving signal and the output light reception signal, a detection signal indicating whether an object exists between the light emitting unit and the light receiving unit, and a control unit including an interrupt port to which the output detection signal is input and for returning from a power saving state in response to the detection signal being input to the interrupt port in the power saving state.

7 Claims, 13 Drawing Sheets

(56) References Cited

U.S. PATENT DOCUMENTS

| | | | | |
|---|---|---|---|---|
| 2011/0080605 A1* | 4/2011 | Wakamiya | ......... | G03G 15/5004 358/1.13 |
| 2011/0253916 A1* | 10/2011 | Murosaki | ................. | B65H 7/04 250/559.07 |
| 2014/0300939 A1* | 10/2014 | Suzuki | ............... | H04N 1/00588 358/498 |
| 2015/0009518 A1* | 1/2015 | Kashiwagi | ......... | H04N 1/00708 358/1.13 |
| 2015/0181051 A1* | 6/2015 | Hirayama | ............ | H04N 1/0071 358/2.99 |
| 2016/0057294 A1* | 2/2016 | Kobayashi | ........... | H04N 1/0074 358/449 |

* cited by examiner

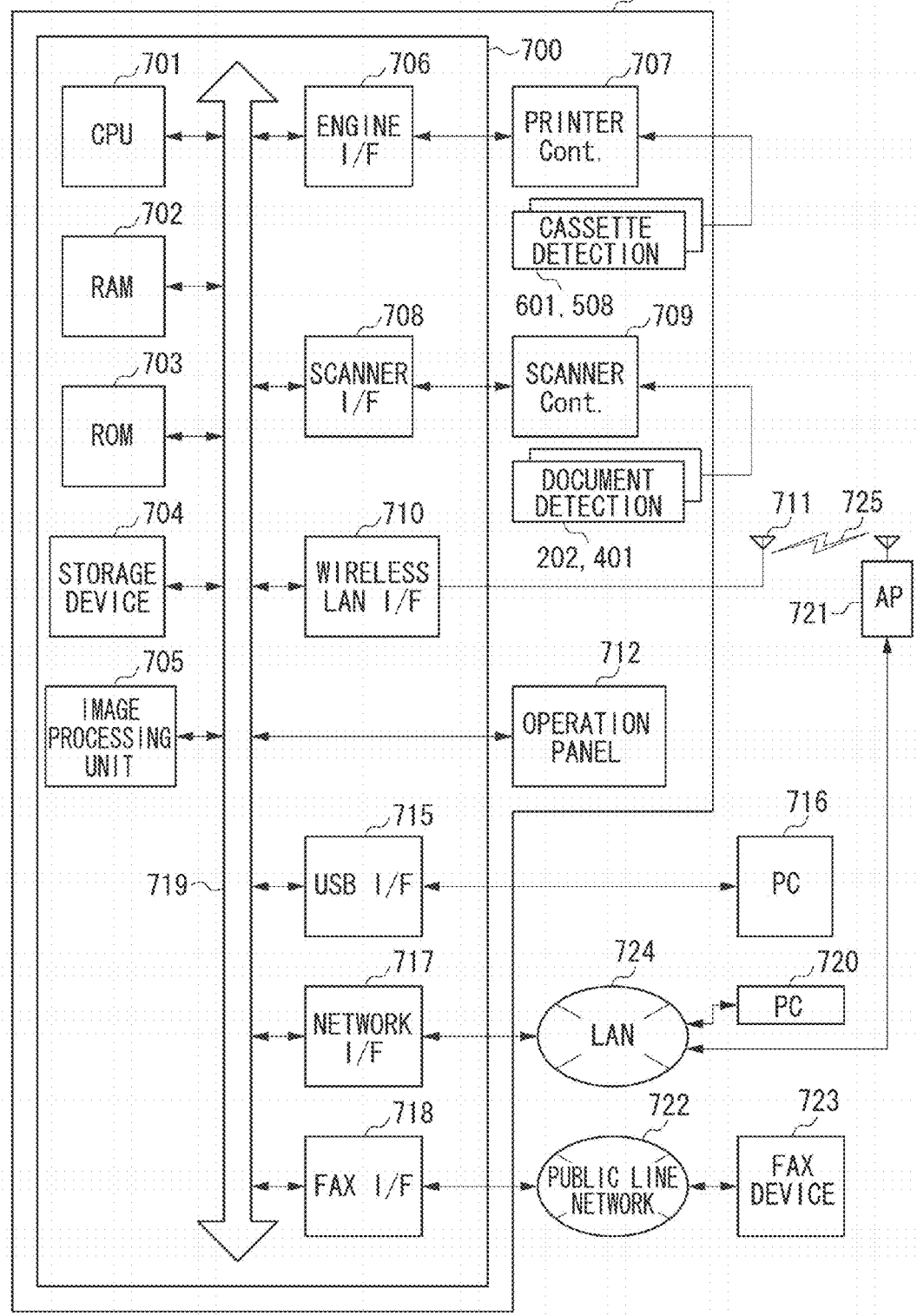

INFORMATION PROCESSING APPARATUS, METHOD FOR CONTROLLING INFORMATION PROCESSING APPARATUS, AND RECODING MEDIUM REGARDING RETURNING FROM A POWER SAVING STATE

BACKGROUND

Field

Aspects of the present invention generally relate to power control of an information processing apparatus.

Description of the Related Art

Conventionally, in an auto document feeder (ADF) included in an image forming apparatus, a combination of a photointerrupter and a movable flag has been often used as a document detection unit for detecting that a document bundle is set on a document stacking tray. The movable flag blocks/transmits light from a light emitting unit of the photointerrupter, in accordance with the presence/absence of the document bundle. The document detection unit thus detects the presence/absence of the document bundle according to light received by a light receiving unit of the photointerrupter being turned ON and OFF.

Generally, an infrared light emitting diode (LED), requiring several hundred mW of power for light emission, is used as the light emitting unit of the photointerrupter. Thus, constant lighting of the infrared LED directly results in larger power consumption of the image forming apparatus. On the other hand, if the light emitting unit is turned OFF while the image forming apparatus is in a power saving mode to achieve low power consumption, the document detection unit would be unable to detect the document bundle.

Japanese Patent Application Laid-Open No. 2006-243238 discusses a technique for solving the problem. More specifically, the infrared LED serving as the light emitting unit of the photointerrupter is intermittently lit, and a document detection signal is monitored at the lighting timings, thereby reducing average power consumption of the infrared LED. Unfortunately, in the conventional technique, a central processing unit (CPU) that controls lighting ON/OFF of the infrared LED and monitors a document detection signal needs to be in constant operation in order to perform the above-mentioned control/monitor. As a result, power consumption saving of the entire image forming apparatus is negatively affected.

SUMMARY

Aspects of the present invention are generally directed to an image processing apparatus capable of saving power of a detection unit that detects an object and a control unit that returns in accordance with a detection result of the detection unit, and causing the control unit to return, based on the detection of the object by the detection unit.

According to an aspect of the present invention, an information processing apparatus includes a detection unit, having a light emitting unit and a light receiving unit for receiving light output from the light emitting unit, configured to output a light reception signal indicating that the light receiving unit has received light from the light emitting unit, a driving signal output unit configured to output a driving signal to the detection unit so that the light emitting unit of the detection unit intermittently outputs light, a detection signal output unit configured to output, based on the driving signal output from the driving signal output unit and the light reception signal output from the detection unit, a detection signal indicating whether an object exists between the light emitting unit and the light receiving unit, and a control unit, including an interrupt port to which the detection signal output from the detection signal output unit is input, configured to return from a power saving state in response to the detection signal being input to the interrupt port in the power saving state.

Further features of the present disclosure will become apparent from the following description of exemplary embodiments with reference to the attached drawings.

BRIEF DESCRIPTION OF THE DRAWINGS

FIG. 7 is a diagram illustrating a hardware configuration example of a controller.

DESCRIPTION OF THE EMBODIMENTS

Various exemplary embodiments will be described in detail below with reference to the drawings.

Figure 1:
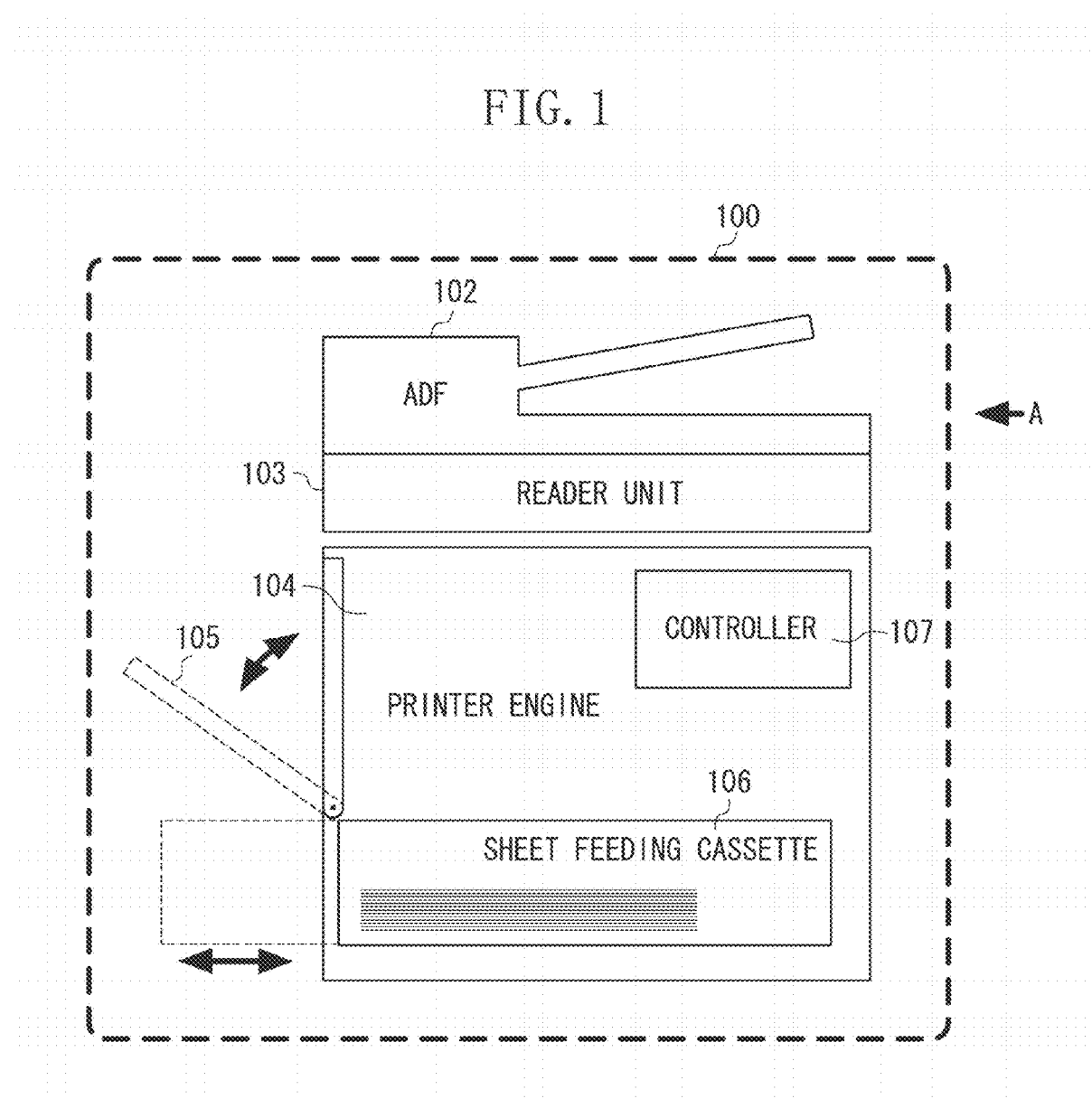
FIG. 1 is a cross-sectional view schematically illustrating a configuration example of an image forming apparatus according to a first exemplary embodiment.

FIG. 1 is a cross-sectional view schematically illustrating a configuration example of an image forming apparatus 100 according to a first exemplary embodiment.

The image forming apparatus 100 includes an automatic document feeder (ADF) 102, a reader unit 103, a printer engine 104, a sheet feeding cassette 106 in which a sheet is set, and a manual feed tray 105 on which a sheet is set for printing on a manually fed sheet. The image forming apparatus 100 further includes a controller 107 that controls the ADF 102, the reader unit 103, the printer engine 104, the sheet feeding cassette 106, and the manual feed tray 105.

In a normal operation (printing), sheets set in the sheet feeding cassette 106 is pulled in one at a time, whereby the printing is executed. When sheets need to be supplied, the sheet feeding cassette 106 can be pulled out (is configured to be detachable) from the printer engine 104 by a user, as illustrated by a dotted line in FIG. 1. The sheets to be fed to the printer engine 104 can be also stacked on the manual feed tray 105. The manual feed tray 105 can be pulled out (is configured to be opened) from the side of the printer engine 104 as illustrated by another dotted line in FIG. 1. The manual feed tray 105 can be used by pulling (opening) it out. The sheet feeding cassette 106 and the manual feed tray 105 may not necessarily be pulled out (opened) to be used as in the configuration of the first exemplary embodiment described above.

Next, a configuration of the ADF 102 will be described with reference to FIG. 2.

Figure 2:
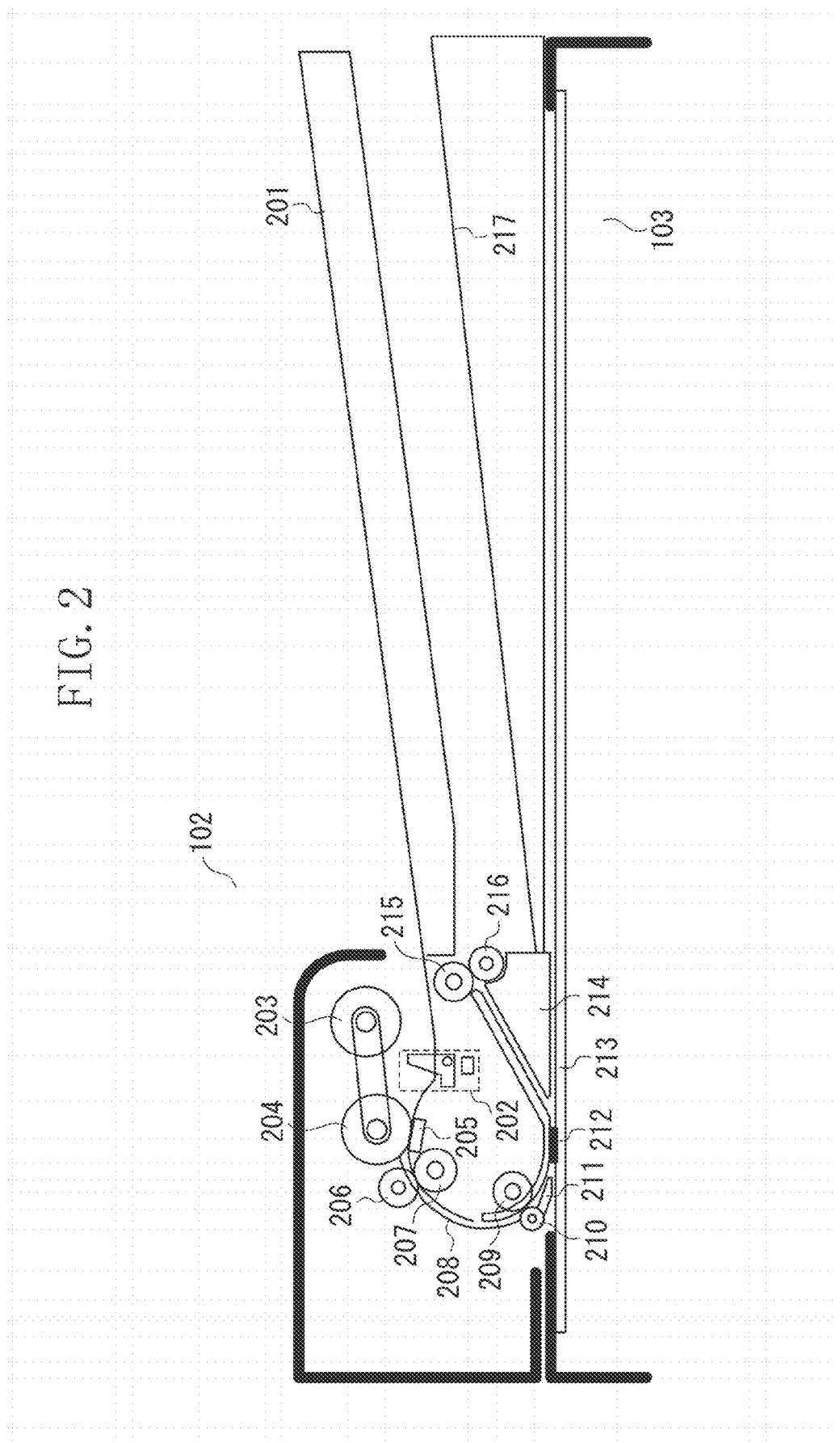
FIG. 2 is a cross-sectional view schematically illustrating a configuration example of an auto document feeder (ADF).

FIG. 2 is a cross-sectional view schematically illustrating a configuration example of the ADF 102.

The ADF 102 includes a document tray 201 on which documents are stacked, a document detection sensor 202, and mechanisms (203 to 216) for pulling the documents in one by one and reading images thereon. The ADF 102 further includes a discharge tray 217 on which the documents from which the images have been read are accumulated.

The mechanisms for pulling the documents in one by one and reading images thereon will be described below in detail.

A pick up roller 203 that pulls a document into the ADF 102 is configured to be lowered to a position to be in contact with the document (the lowered state is not illustrated). A mechanism for conveying documents includes a separation pad 205 and a separation roller 204 that face each other. The separation roller 204, constantly being in contact with the separation pad 205, separates only the top one from a bundle of documents by friction to convey the document.

The document separated by the separation roller 204 is conveyed toward a lower portion of the ADF 102 by a first conveyance roller 206, a conveyance roller 207, and an inner guide 208 that guides conveyance. The document conveyed to the lower portion is conveyed to a document reading position 212 by a pre-reading stage roller 209 and a pressing roller 210, while being guided by a guide mylar 211.

When the document contacts a platen glass 213 at the document reading position 212, an image on the document is read by an image sensor (not illustrated) located below the platen glass 213. The document, from which the image has been read, reaches discharge rollers 215 and 216 through a discharge guide 214 to be discharged onto the discharge tray 217.

Next, an operation of the document detection sensor 202 for detecting whether the bundle of documents is set on the ADF 102 will be described with reference to FIG. 3.

FIG. 3 is a diagram for illustrating the document detection sensor 202.

As illustrated in FIG. 3, the document detection sensor 202 includes a movable flag 301 and a photointerrupter 302.

Figure 3A:
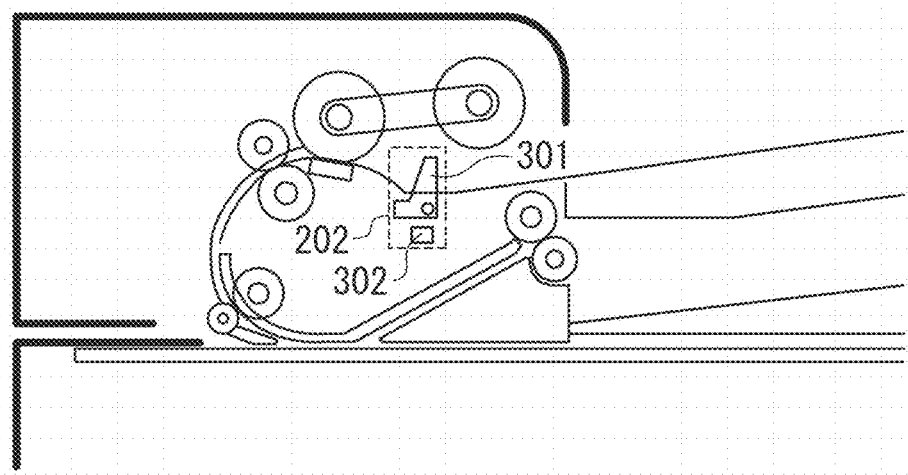
FIGS. 3A and 3B are diagrams for illustrating a document detection sensor.
Figure 3B:
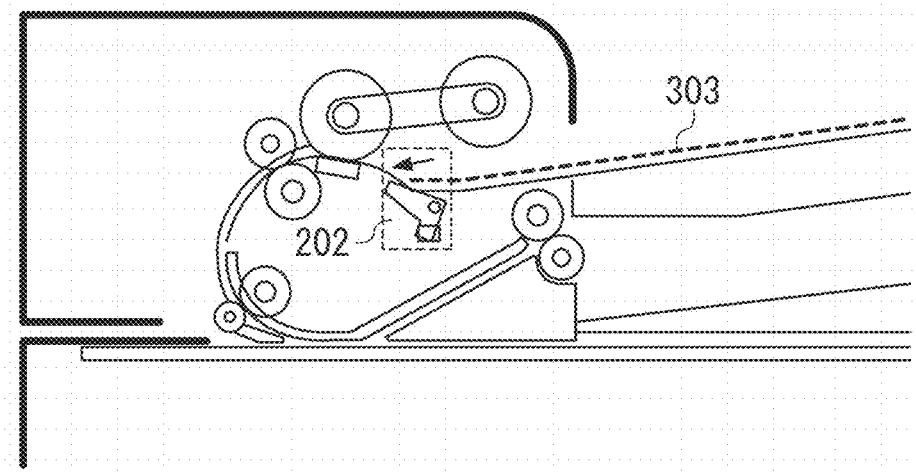

FIG. 3A illustrates a state where no document is set on the document tray 201 of the ADF 102. FIG. 3B illustrates a state where documents are set thereon. A dotted line in FIG. 3B represents a document bundle 303.

When the document bundle 303 is set on the document tray 201, the movable flag 301 moves from the state illustrated in FIG. 3A to the state illustrated in FIG. 3B to block a light emitting unit and a light receiving unit of the photointerrupter 302. This blocks light to be received by the light receiving unit, and an output signal from the photointerrupter 302 changes accordingly. The document detection sensor 202 can thereby detect that the document bundle 303 has been set.

FIG. 4 is a diagram illustrating the ADF 102 and the reader unit 103 of the image forming apparatus 100 as viewed in a direction of an arrow A in FIG. 1.

Figure 4A:
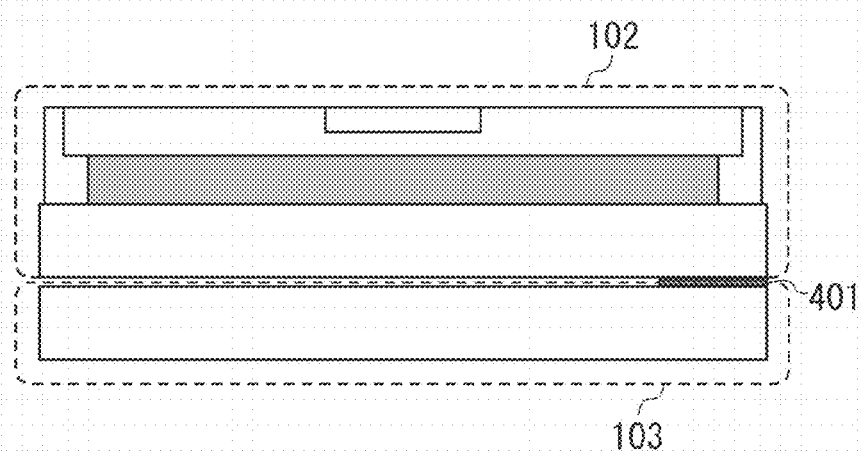
FIGS. 4A and 4B are side views of the ADF and a reader unit of the image forming apparatus.
Figure 4B:
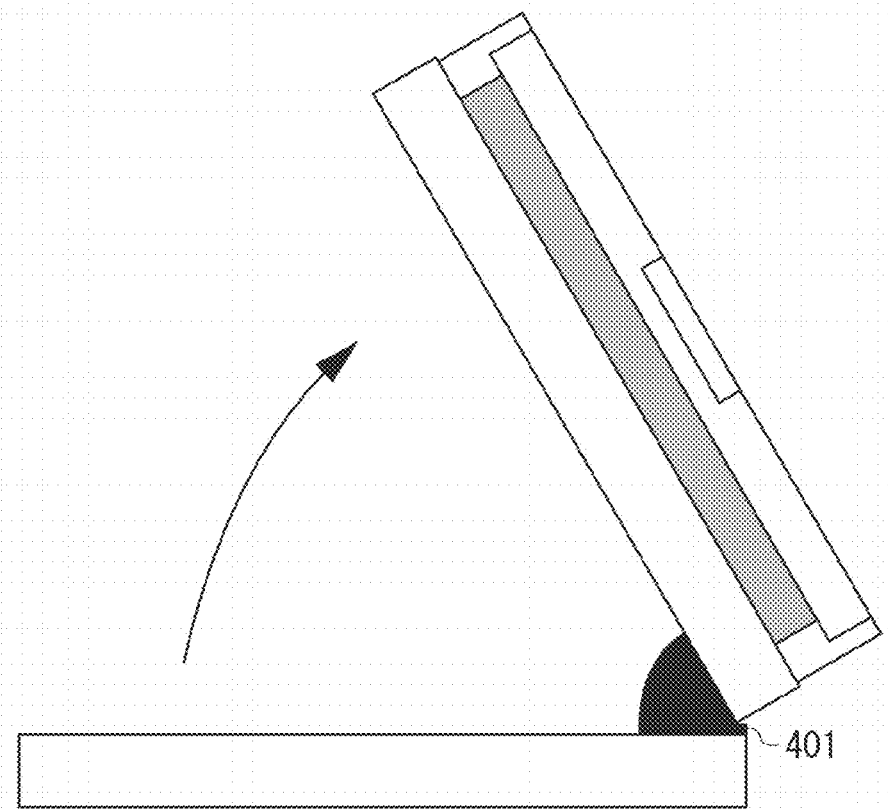

The ADF 102 also serves as a pressing plate portion that presses the document stacked on the platen glass 213 against the platen glass 213. FIG. 4A illustrates a state where the ADF 102 is closed, whereby the document is pressed against the platen glass 213. The ADF 102 is configured to be pivoted upward about a hinge unit 401 so that a document is placed on the platen glass 213. FIG. 4B illustrates a state where the ADF 102 is opened. Although not elaborated in the figure, the hinge unit 401 includes a photointerrupter and a movable flag, as in the case of the document detection sensor 202 illustrated in FIG. 3, whereby a state of an output signal changes according to the opening and closing of the ADF 102.

Figure 5A:
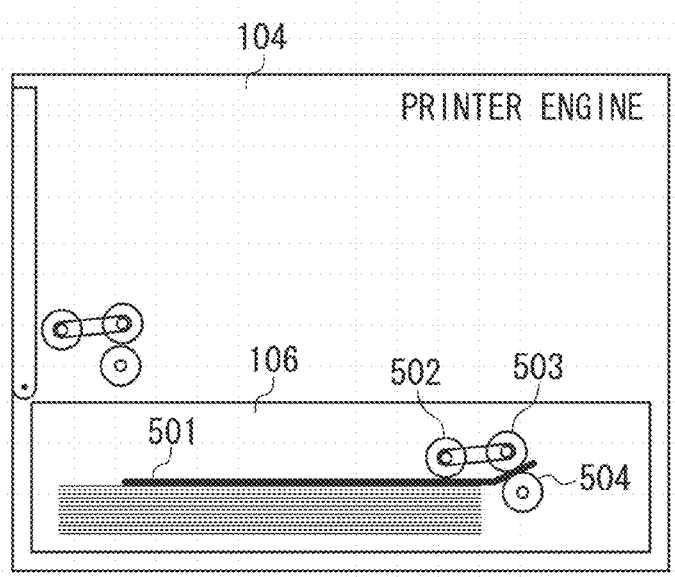
FIGS. 5A, 5B, and 5C are cross sectional views schematically illustrating a configuration example of a printer engine.
Figure 5B:
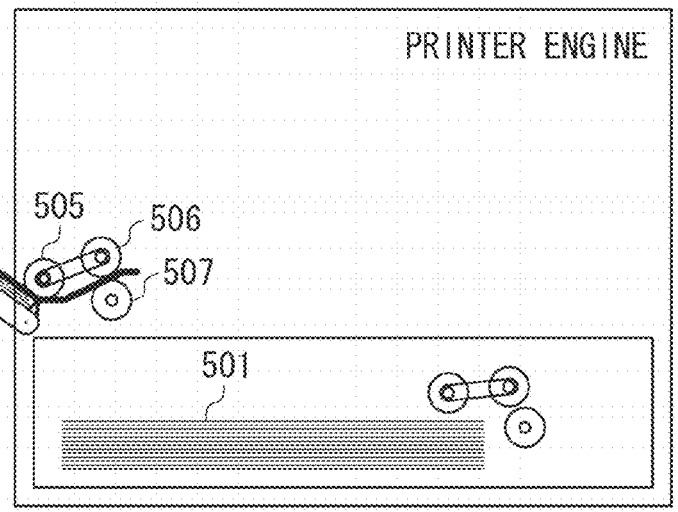
Figure 5C:
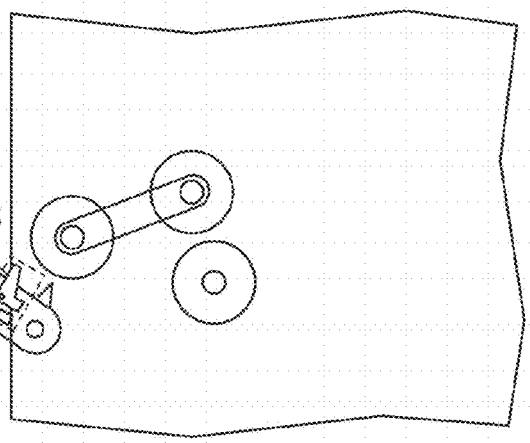

FIGS. 5A, 5B, and 5C are cross sectional views schematically illustrating a configuration example of the printer engine 104.

As illustrated in FIG. 1, the printer engine 104 includes the sheet feeding cassette 106, the manual feed tray 105, and the like. When feeding from the sheet feeding cassette 106 is instructed, a sheet 501 is separated and conveyed by a sheet feeding cassette separation roller 502, a sheet feeding cassette conveyance roller 503, and a sheet feeding cassette conveyance roller 504, as illustrated in FIG. 5A. On the other hand, when feeding from the manual feed tray 105 is instructed, the sheet 501 is separated and conveyed by a manual feed separation roller 505, a manual feed conveyance roller 506, and a manual feed conveyance roller 507, as illustrated in FIG. 5B.

FIG. 5C illustrates a configuration position of a manual feed sheet detection unit 508 that detects whether a sheet has been set on the manual feed tray 105. The manual feed sheet detection unit 508 includes a movable flag and a photointerrupter, as in the case of the document detection sensor 202, and detects a sheet through the procedure described above.

Figure 6A:
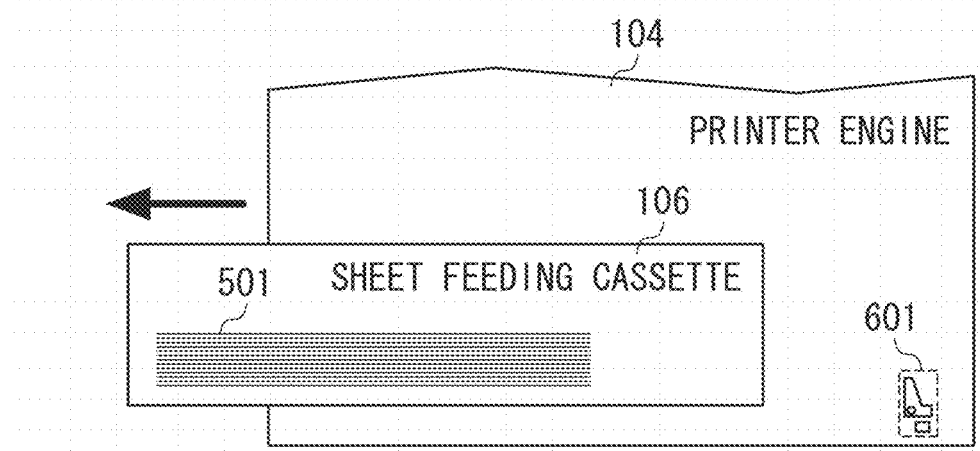
FIGS. 6A and 6B are enlarged cross-sectional views of a portion around a sheet feeding cassette of the printer engine.
Figure 6B:
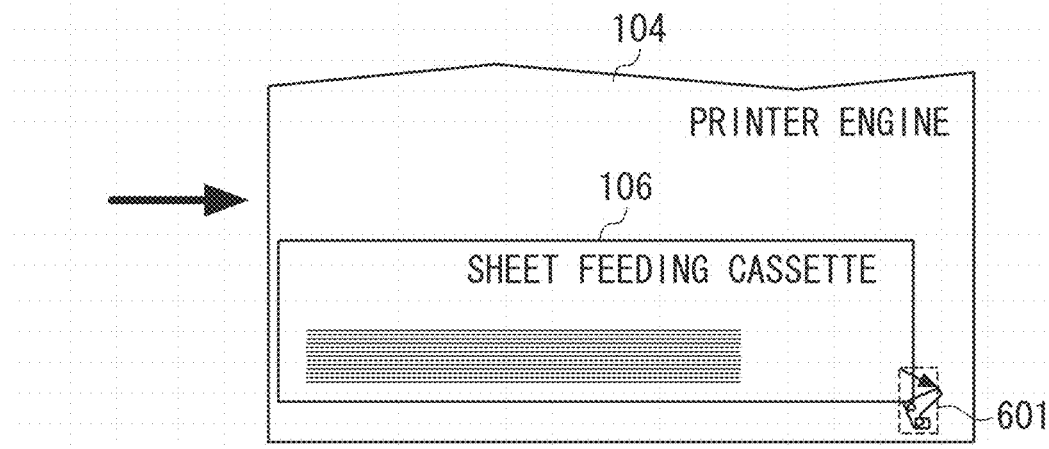

FIGS. 6A and 6B are enlarged cross-sectional views of a portion around the sheet feeding cassette 106 of the printer engine 104. FIG. 6A illustrates a state where the sheet feeding cassette 106 is pulled out. FIG. 6B illustrates a state where the sheet feeding cassette 106 is accommodated. The printer engine 104 includes a sheet feeding cassette opening/closing detection unit 601 by which an opening/closing state of the sheet feeding cassette 106 can be detected. The sheet feeding cassette opening/closing detection unit 601 as well has a structure and a configuration similar to those of the document detection sensor 202 described above, and thus the detection procedure will not be described.

FIG. 7 is a diagram illustrating a hardware configuration example of the controller 107 illustrated in FIG. 1.

The controller 107 includes a controller board 700, a scanner controller (scanner Cont.) 709, a printer controller (printer Cont.) 707, and an operation panel 712 that work together to implement printing, scanning, copying, facsimile functions and the like.

The scanner controller 709 controls document reading. The printer controller 707 controls printing of print data onto a sheet. The operation panel 712 controls various types of settings and display of an alarm and the like.

The scanner controller 709 is connected to the document detection sensor 202 that performs document detection and a platen opening/closing detection sensor (provided in the hinge unit 401). As described above, the document detection sensor 202 is provided in the ADF 102, whereas the platen opening/closing detection sensor is provided in the hinge unit 401, which supports the opening and closing of the ADF 102. The sensors notify the scanner controller 709 of the presence/absence of a document bundle stacked on the document tray 201 and the opening/closing state of the ADF 102, respectively.

The printer controller 707 is connected to the sheet feeding cassette opening/closing detection unit 601 and the manual feed sheet detection unit 508. As described above, the sheet feeding cassette opening/closing detection unit 601 is provided in the printer engine 104, whereas the manual feed sheet detection unit 508 is provided in a hinge unit that supports the opening and closing of the manual feed tray 105. The sensors notify the printer controller 707 of the accommodated state of the sheet feeding cassette 106 and the opening/closing state of the manual feed tray 105, respectively.

A central processing unit (CPU) 701 in the controller board 700 is a controller that controls the entire image forming apparatus 100. The CPU 701 is connected through a system bus 719 to the components included therein. The CPU 701 can communicate with the outside through external interfaces (I/Fs) (718, 717, 715, 710, and the like).

A facsimile interface (FAX I/F) 718 is connected to a public line network 722 through a modular jack, and performs facsimile transmission/reception with a FAX device 723. A network interface (network I/F) 717 is connected to a local area network (LAN) 724 through a LAN I/F connector, and performs network communication with a personal computer (PC) 720 and the like. The LAN 724 is also connected to an access point (AP) 721, whereby network communication can be performed with the PC 720 and the like through a wireless LAN 725. A universal serial bus interface (USB I/F) 715 establishes local connection with a PC 716 and the like through a USB connector, and performs USB communication. A wireless LAN interface (wireless LAN I/F) 710 is connected to the AP 721 through a wireless LAN antenna 711 by the wireless LAN 725, and performs wireless LAN communication.

Internal communication can be performed through internal I/Fs (708, 706). Data communication is performed with the scanner controller 709 through a scanner interface (scanner I/F) 708. Data communication is performed with the printer controller 707 through an engine interface (engine I/F) 706. Data communication is performed with the operation panel 712 through the system bus 719.

A read only memory (ROM) 703 is a boot ROM, and stores a boot program of the image forming apparatus 100. A random access memory (RAM) 702 is a system work memory for the operation of the CPU 701, and stores calculation data and various types of programs of the CPU 701. The RAM 702 also serves as an image memory for storing image data on which various types of image processing have been performed by an image processing unit 705 during printing or the like. A storage device 704 is a non-volatile secondary storage device for storing large-sized programs and data, and the stored large-sized programs and data are loaded into the RAM 702 to be used. The storage device 704 is a hard disc drive (HDD) or a solid state drive (SSD), for example. The CPU 701 reads and executes programs stored in the ROM 703 and the storage device 704, thereby controlling the image forming apparatus 100. The image forming apparatus 100 can operate while switching at least between a normal mode and a power saving mode in which power consumption is smaller than in the normal mode.

First, a conventional circuit for driving a document detection sensor will be described with reference to FIG. 8.

Figure 8:
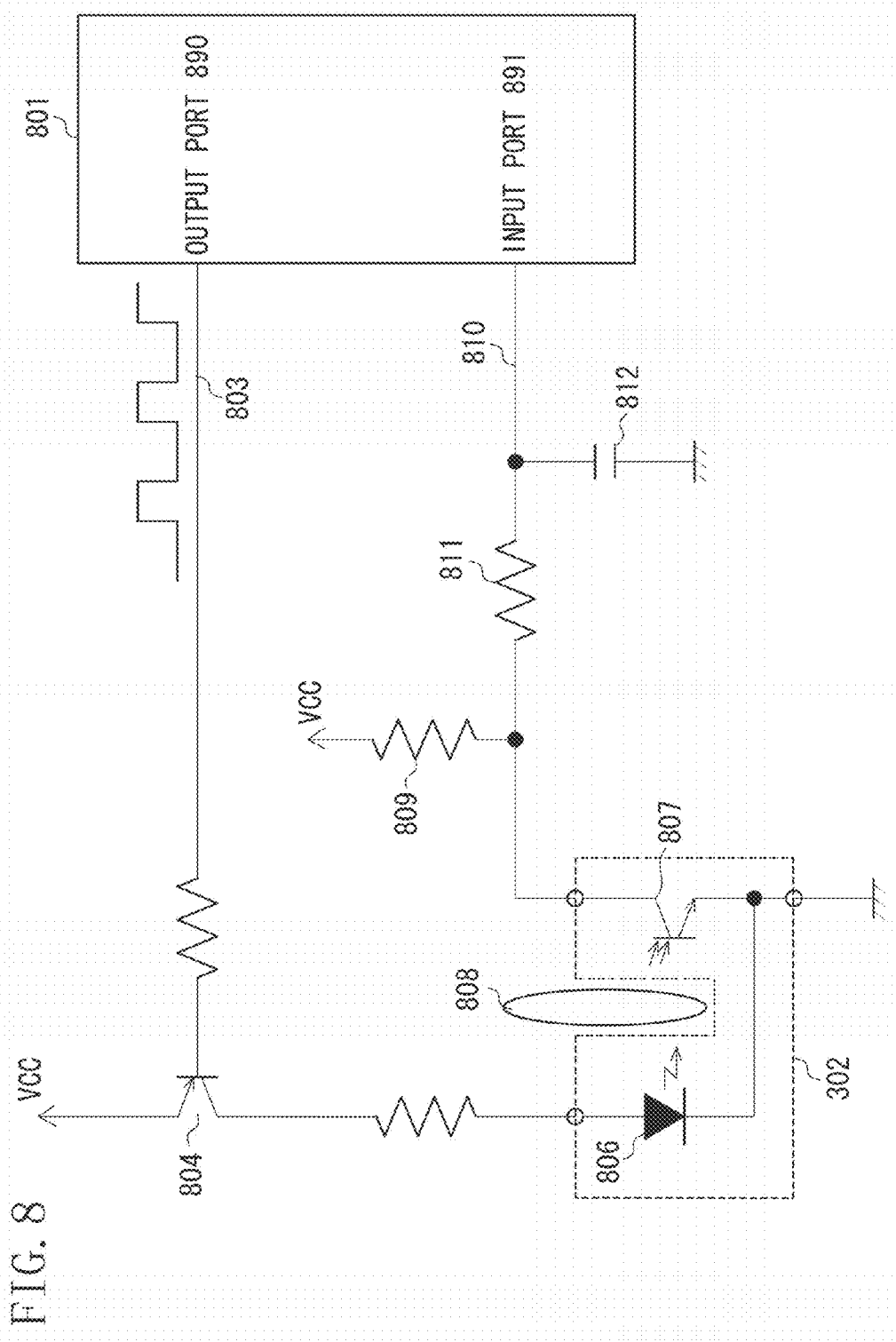
FIG. 8 is a diagram illustrating a conventional circuit for driving a document detection sensor.

FIG. 8 is a diagram for illustrating a conventional circuit for driving a document detection sensor, particularly for illustrating a driving circuit for causing a light emitting unit (an infrared light emitting diode (LED) 806) of the photointerrupter 302 to intermittently emit light in a conventional technique.

As illustrated in FIG. 8, conventionally, a CPU 801 (provided in the scanner controller 709, for example) including an output port 890 and an input port 891 controls a driving signal 803 and a document detection signal 810 from a light emitting unit (the infrared LED 806).

Causing the infrared LED 806 to intermittently emit light provides the effect of reducing power consumption as follows. For example, the amount of power required for continuously lighting the infrared LED 806 that consumes constant power of 100 mW is 100 mWh. If, on the other hand, the infrared LED 806 is caused to intermittently emit light at a duty rate of 20%, the amount of required power is reduced to 20 mWh, which is 20% of 100 mWh, resulting in reduction in power consumption of 80 mWh.

Operations performed by the circuit illustrated in FIG. 8 will be described below.

The driving signal 803 output from the output port 890 of the CPU 801 is input to an LED driving transistor 804. The LED driving transistor 804 is turned ON when its base potential is low and turned OFF when its base potential is high. The infrared LED 806 is therefore turned ON when the driving signal 803 is low and turned OFF when the signal is high.

On the other hand, a phototransistor 807 on the light receiving unit side is turned ON upon receiving light from the infrared LED 806, which is the light emitting unit, and turned OFF when light cannot be received. In the circuit illustrated in FIG. 8, the phototransistor 807 is turned OFF when a light-blocking object 808 (included in the movable flag 301) blocks light from the infrared LED 806 or the LED driving transistor 804 is turned OFF to thereby turn OFF the infrared LED 806.

When the phototransistor 807 is turned ON, the ON state is established between an emitter and a collector, whereby the output of the photointerrupter 302 becomes low. On the other hand, when the phototransistor 807 is turned OFF, a pull-up resistor 809 makes the output high. The output signal of the photointerrupter 302 is input to the input port 891 of the CPU 801 through a low-pass filter (811 and 812), as the document detection signal 810.

In this process, the CPU 801 monitors the document detection signal 810 in accordance with the timing at which the driving signal 803 becomes low (when the infrared LED 806 is turned ON), thereby determining whether a document is on the document tray 201. For this reason, even when the image forming apparatus 100 is in the power saving mode, the CPU 801, which controls the driving circuit, needs to be constantly in operation.

Next, with reference to FIG. 9, a circuit for driving the document detection sensor according to the first exemplary embodiment will be described.

Figure 9:
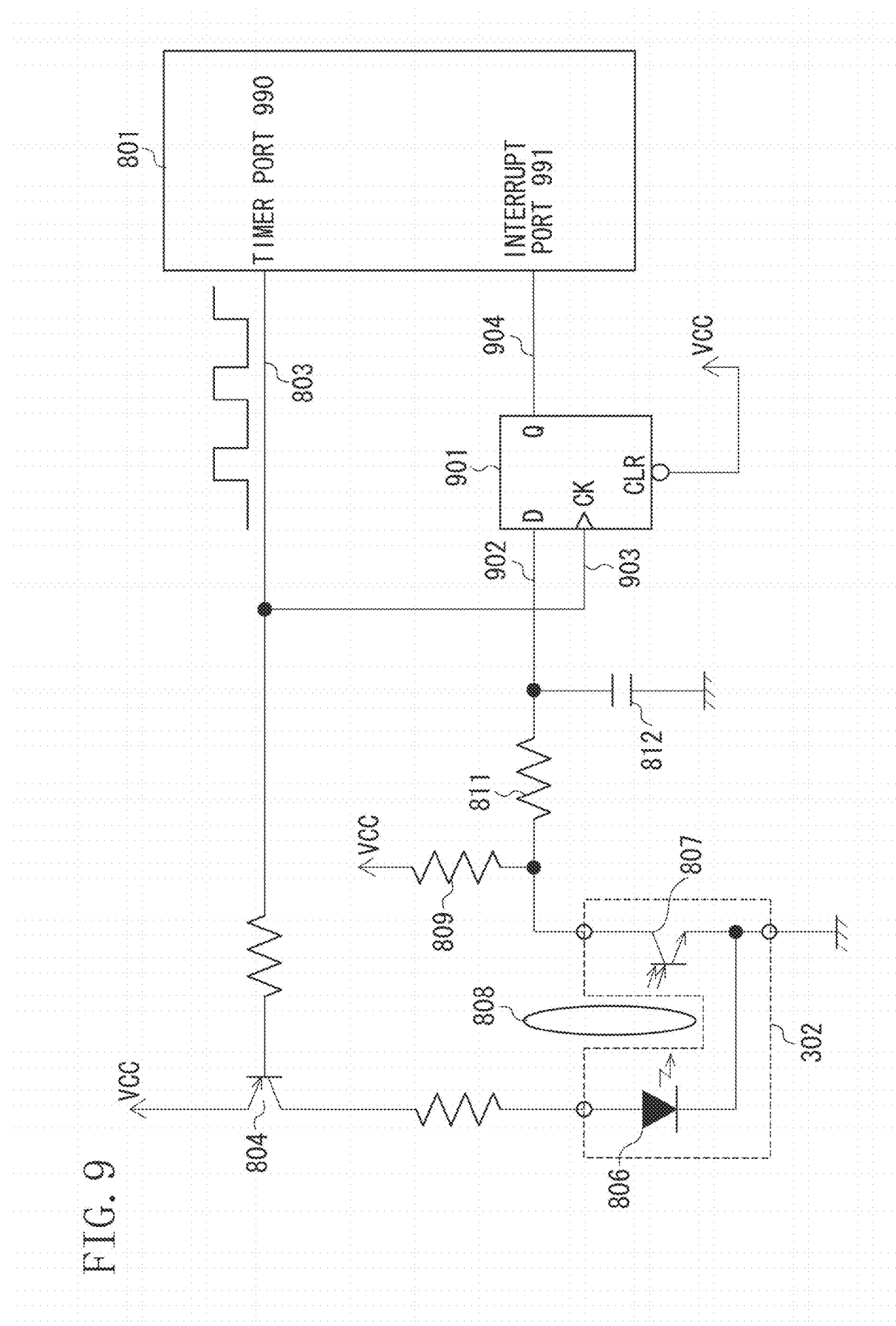
FIG. 9 is a diagram illustrating a circuit for driving the document detection sensor according to the first exemplary embodiment.

FIG. 9 is a diagram illustrating a circuit for driving the document detection sensor according to the first exemplary embodiment, particularly illustrating a driving circuit for the photointerrupter 302 according to the first exemplary embodiment.

The feature of the driving circuit illustrated in FIG. 9 lies in that a D-type flip-flop 901 is added to the conventional driving circuit illustrated in FIG. 8. In addition, the CPU 801 of the scanner controller 709 selects a port to which a toggle waveform signal can be output at a constant cycle/constant duty, as a port for generating the driving signal 803 to be output, using a Pulse Width Modulation (PWM) function or a timer function. The timer function is a function of toggling output signals in accordance with settings (e.g., cycle, duty rate). With the PWM function and the timer function, the CPU 801 no longer needs to control the output to generate the driving signal 803. In other words, the CPU 801 only needs to set the cycle and duty rate of the timer function and issue a start instruction in order to generate toggle signals without the direct control. The port selection enables the CPU 801 to enter a suspended mode, which is a mode for waiting an interruption, or the power saving mode to stand by. The CPU 801 can operate while switching at least between the normal mode and the suspended mode (or the power saving mode) in which power consumption is smaller than in the normal mode. In the present exemplary embodiment, a timer port 990 capable of using the timer function serves as an example of a port for generating the driving signal 803.

In addition, as a port of the CPU 801 for inputting a document detection signal 904, an interrupt port 991 is selected. Thus, even when the CPU 801 stands by in the suspended state, being triggered by an interrupt request by the document detection signal 904 (an interrupt request signal), the CPU 801 can return to the normal state. Furthermore, even when an interrupt factor is checked after the CPU 801 returns to the normal state, the CPU 801 can properly perform processing after the return because the D-type flip-flop 901 holds the signal level. During standby in the power saving mode, the CPU 801 can shift from the power saving mode to the normal mode in accordance with changes in signals input from the interrupt port 991 and held by the D-type flip-flop 901.

Operations performed by the driving circuit illustrated in FIG. 9 will be described below with reference to FIG. 10.

Figure 10:
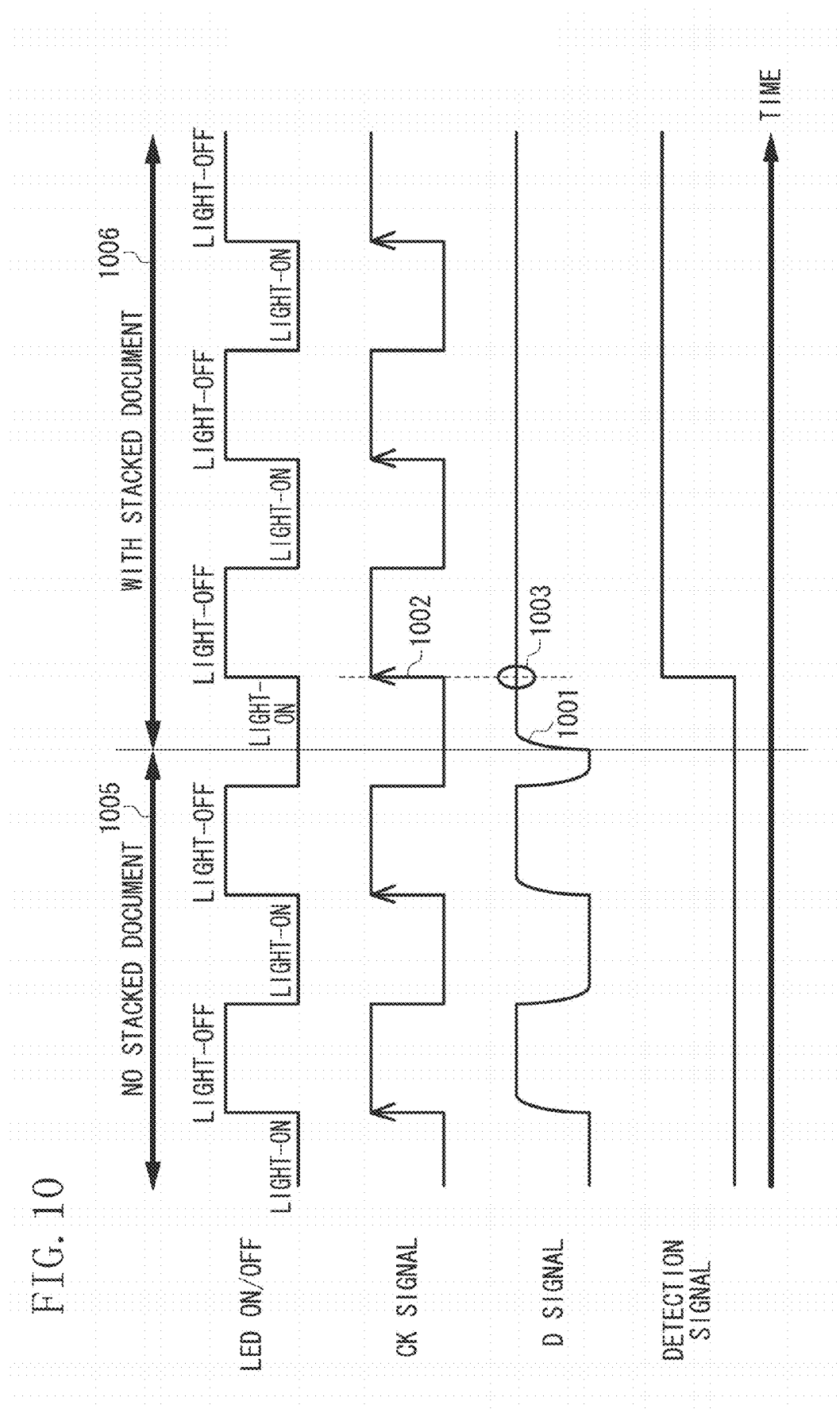
FIG. 10 is a timing chart illustrating operations performed by a document detection sensor driving circuit according to the first exemplary embodiment.

FIG. 10 is a timing chart illustrating operations performed by a document detection sensor driving circuit according to the first exemplary embodiment.

As illustrated in FIG. 9, the driving signal 803 is input not only to the LED driving transistor 804, but also to a clock (CK) terminal 903 of the D-type flip-flop 901. As illustrated in FIG. 10, the lighting ON/OFF timing of the infrared LED 806 is therefore in synchronization with the timing of signal input to the CK terminal 903.

On the other hand, during a period (1005) in which no document is stacked with no light-blocking object 808, the state of signals input to a D terminal 902 of the D-type flip-flop 901 are toggled in accordance with the lighting ON/OFF of the infrared LED 806. It should be noted that with the effects of the resistor-capacitor (RC) low-pass filter (811 and 812), the signals input to the D terminal 902 have a waveform gently rising and dropping.

When a document bundle is set on the document tray 201 so that a period (1006) with stacked documents arrives, even if the infrared LED 806 is lighting, the light-blocking object 808 blocks the light from the infrared LED 806 to turns the phototransistor 807 OFF, whereby signals input to the D terminal 902 rises to be high (1001). At a timing (1002) at which the signal input to the CK terminal 903 subsequently rises to be high, the state (1003) of the D terminal 902 signal is reflected on a Q terminal 904, whereby a document detection signal (high level signal) is input to the interrupt port 991 of the CPU 801. By setting the interrupt port 991 of the CPU 801 so that it issues interruption at the high level, the CPU 801 can return to the normal mode in response to the transition of this signal level.

Next, operations performed by the CPU 801 and the like illustrated in FIG. 9 will be described with reference to FIG. 11.

Figure 11:
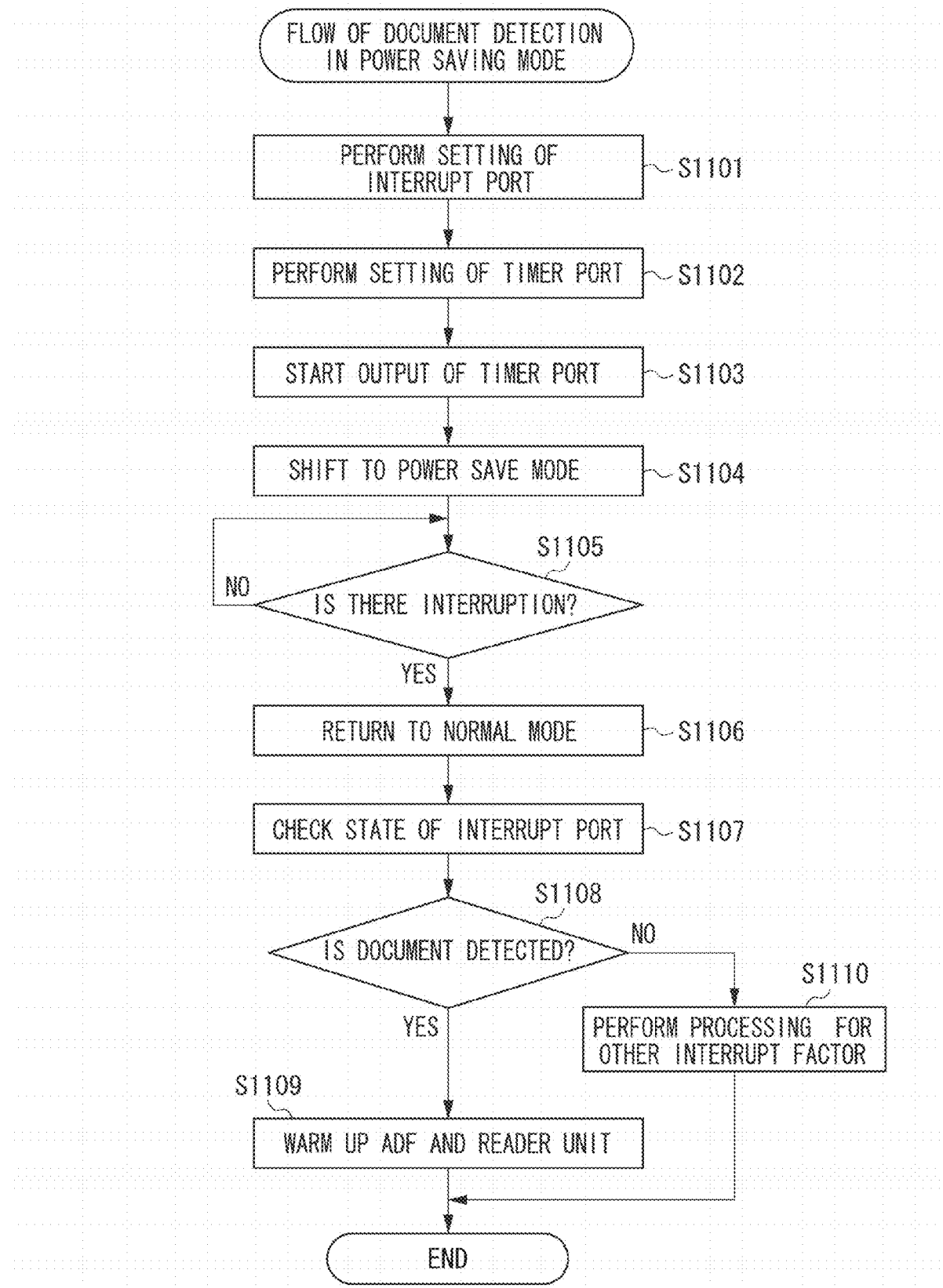
FIG. 11 is a flowchart illustrating an example of operations performed by a central processing unit (CPU) or the like for controlling a document detection sensor, according to the first exemplary embodiment.

FIG. 11 is a flowchart illustrating an example of operations performed by the CPU 801 and the like when the image forming apparatus 100 according to the first exemplary embodiment shifts to the power saving mode. The processing performed by the CPU 801 in the flowchart is implemented by the CPU 801 (provided in the scanner controller 709, for example) executing a program stored in a ROM (not illustrated) (in the scanner controller 709, for example) or the like.

When the image forming apparatus 100 shifts to the power saving mode, the CPU 801 starts the processing in FIG. 11. As illustrated in FIG. 9, the CPU 801 includes the port 990 having the timer function (or the PWM function) and the port (Interrupt ReQuest (IRQ)) 991 having the interrupt function.

When the processing in FIG. 11 starts, the CPU 801 sets the interrupt port 991 in step S1101 and sets the timer port 990 in step S1102. More specifically, the CPU 801 sets edge trigger or level trigger for the interrupt port 991. When the level trigger is set, whether the trigger is issued at the high level or the low level is set. For the timer port 990, the CPU 801 sets the cycle and duty rate of toggling. After the settings by the CPU 801 in steps S1101 and S1102 are completed, the processing proceeds to step S1103.

In step S1103, the CPU 801 starts output of the timer port 990. In step S1104, the CPU 801 then shifts to the power saving mode. In the power saving mode, the power consumption of the CPU 801 itself can be reduced by reducing an operation clock frequency, for example. After step S1104, an external circuit of the CPU 801 operates in accordance with the output of the timer port 990 as described above.

Next, if the document detection signal 904 indicating whether a document bundle is placed on the document tray 201 of the ADF 102 shifts to a state in which an interrupt request is issued to the CPU 801 (Yes in step S1105), the interrupt request reaches the CPU 801. In step S1106, the CPU 801 then returns from the power saving mode to the normal mode.

Upon returning to the normal mode, in step S1107, the CPU 801 checks to which port the interrupt request is issued (what the interrupt factor is), thereby determining in step S1108 what the interrupt request is.

If the CPU 801 determines that the interrupt request is an interrupt request by the document detection signal 904 (Yes in step S1108), the processing proceeds to step S1109. In step S1109, the CPU 801 warms up the ADF 102 and the reader unit 103 to be ready for copying or scanning using the ADF 102. In step S1109, the CPU 801 notifies a power control unit (not illustrated) of the image forming apparatus 100 that the interrupt request by the document detection signal 904 has been issued. The power control unit having been thus notified causes the image forming apparatus 100 to return from the power saving mode.

On the other hand, if the CPU 801 determines that the interrupt request is not an interrupt request by the document detection signal 904 (No in step S1108), in step S1110, the CPU 801 performs processing according to the corresponding interrupt factor. The processing performed therein will not be described in detail herein. In step S1110, the CPU 801 notifies, as required, a power control unit (not illustrated) of the image forming apparatus 100 that such an interrupt request has been issued. The power control unit having been thus notified causes the image forming apparatus 100 to return from the power saving mode as required.

As described above, according to the first exemplary embodiment, power consumed by the CPU 801 and a photointerrupter 302 can be reduced. More specifically, an image processing apparatus capable of reducing power of the document detection sensor 202 itself while shifting the CPU 801 controlling the document detection sensor 202 of the ADF 102 to the power saving state can be provided.

Referring to FIG. 9 (the first exemplary embodiment), a toggle signal from the timer port 990 serves as the driving signal 803 and a signal from the D-type flip-flop 901 serves as the document detection signal 904, regardless of whether the image forming apparatus 100 is in the power saving mode or in the normal mode. In the normal mode, however, if the driving signal 803 of the infrared LED 806 is an intermittent signal, the document detection sensor 202 may fail to quickly respond to stacking of a document bundle on the document tray 201 of the ADF 102. For this reason, when the image forming apparatus 100 is in the normal mode, it is desirable that the infrared LED 806 is kept ON (continuous lighting) and an output signal from the photointerrupter 302 is directly input to the CPU 801, as the document detection signal 904. This configuration is illustrated in FIG. 12.

A circuit for driving a document detection sensor according to a second exemplary embodiment will be described below with reference to FIG. 12. FIG. 12 is a diagram illustrating the circuit for driving the document detection sensor according to the second exemplary embodiment, particularly illustrating a driving circuit of the photointerrupter 302 according to the second exemplary embodiment.

Figure 12:
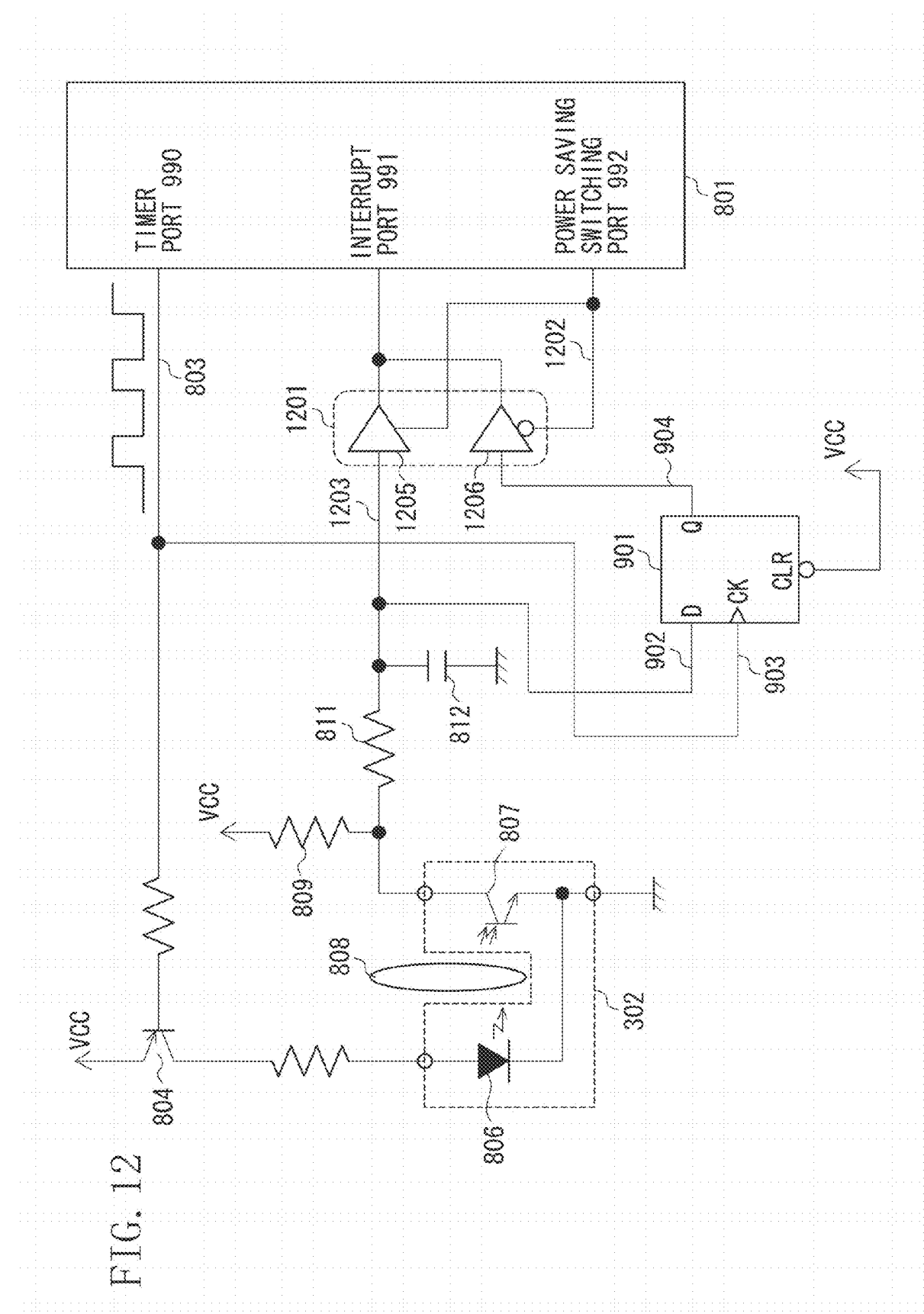
FIG. 12 is a diagram illustrating a circuit for driving a document detection sensor according to a second exemplary embodiment.

In FIG. 12, a circuit added to the configuration in FIG. 9 (the first exemplary embodiment) is a bus switch 1201. The bus switch 1201 switches between an output signal 1203 of the photointerrupter 302 and an output signal of the D-type flip-flop 901, in accordance with a selection signal 1202. For example, when the image forming apparatus 100 is in the normal mode, the CPU 801 outputs the selection signal 1202 from a power saving switching port 992.

When the selection signal 1202 rises to be high, the output of a buffer 1 (1205) of the bus switch 1201 becomes valid, whereas the output of a buffer 2 (1206) becomes invalid (high impedance). This results in gating of the output 904 from the D-type flip-flop 901, whereby the output from the photointerrupter 302 is directly input to the interrupt port 991.

On the other hand, when the image forming apparatus 100 is in the power saving mode, the selection signal 1202 output from the power saving switching port 992 is set to be low. Consequently, the output of the buffer 1 (1205) of the bus switch 1201 becomes invalid (high impedance), whereas the output of the buffer 2 (1206) becomes valid. This causes the output 904 from the D-type flip-flop 901 to be input to the interrupt port 991.

Furthermore, in the normal mode, the timer port 990 is set so that the infrared LED 806 is kept ON (continuous lighting), while in the power saving mode, the timer port 990 is set so that the output signal is toggled (intermittent lighting), as described with reference to FIG. 9 (in the first exemplary embodiment). With this setting, a document bundle stacked on the document tray 201 can be immediately detected when the image forming apparatus 100 is in the normal mode, whereas power consumed by the CPU 801 and the photointerrupter 302 can be reduced when the image forming apparatus 100 is in the power saving mode.

Next, operations performed by the CPU 801 and the like illustrated in FIG. 12 will be described with reference to FIG. 13.

Figure 13:
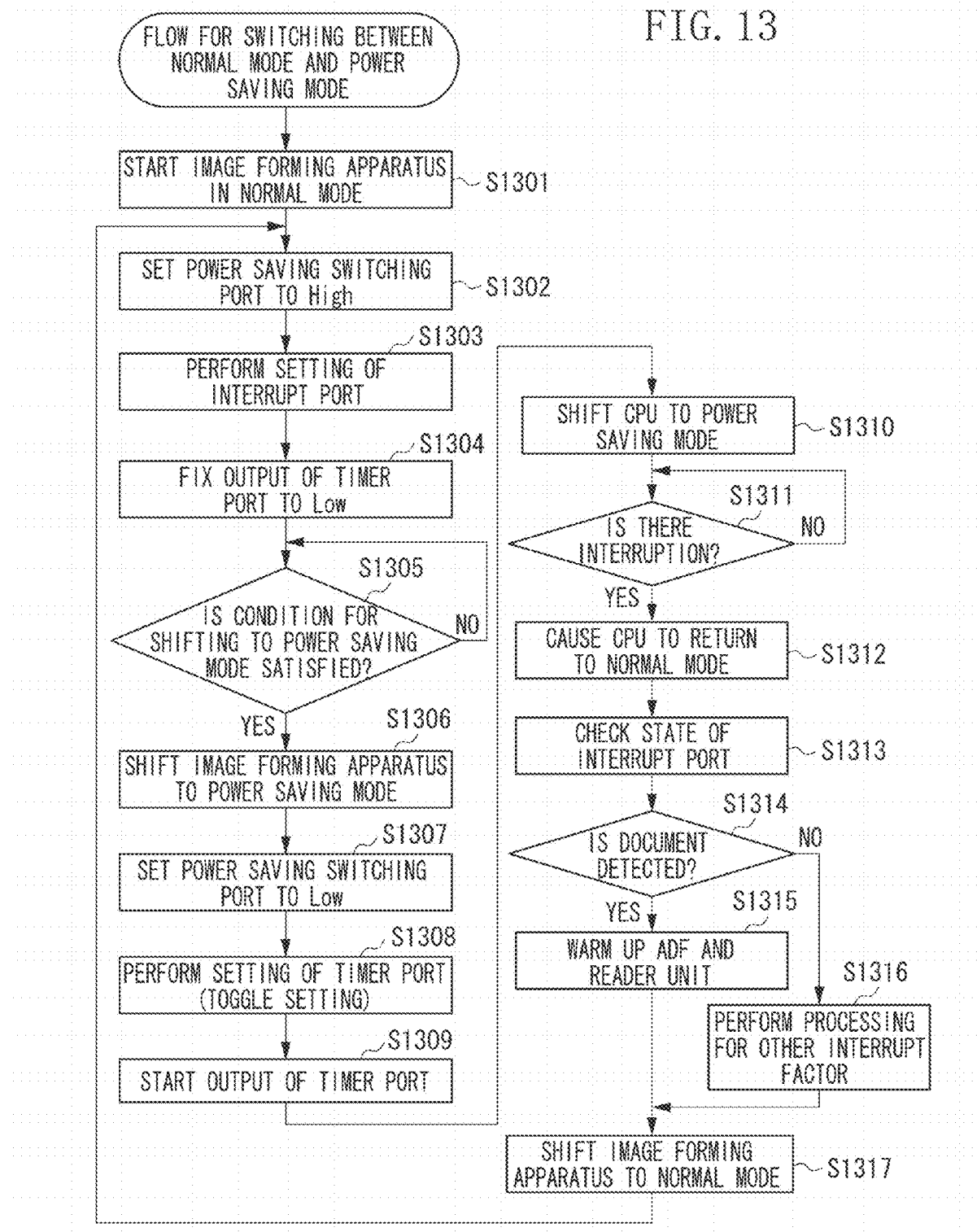
FIG. 13 is a flowchart illustrating an example of operations performed by a CPU or the like for controlling a document detection sensor, according to the second exemplary embodiment.

FIG. 13 is a flowchart illustrating an example of operations performed by the CPU 801 and the like when the image forming apparatus 100 according to the second exemplary embodiment shifts to the power saving mode. The processing performed by the CPU 801 in the flowchart is implemented by the CPU 801 (provided in the scanner controller 709, for example) executing a program stored in a ROM (not illustrated) (in the scanner controller 709, for example) or the like.

First, in step S1301, the image forming apparatus 100 is started in the normal mode. The processing in step S1301 is performed by the CPU 701, for example. The CPU 701, for example, notifies the CPU 801 that the image forming apparatus 100 has been started in the normal mode. When the image forming apparatus 100 is in the normal mode, in step S1302, the CPU 801 sets the power saving switching port 992 to be high, and the output of the photointerrupter 302 to be directly input to the interrupt port 991 of the CPU 801.

Next, in step S1303, the CPU 801 performs setting of the interrupt port 991. The setting is made as in step S1101 in FIG. 11 described above, and thus will not be described. Next, in step S1304, the CPU 801 sets the output from the timer port 990 to be constantly low. As a result, the infrared LED 806 of the photointerrupter 302 is kept ON, whereby a state where document detection can be constantly performed is achieved.

In this state, the image forming apparatus 100 stays in the normal mode until a condition for shifting the image forming apparatus 100 to the power saving mode is satisfied (No in step S1305). Once the condition for shifting the image forming apparatus 100 to the power saving mode is satisfied (for example, when a no-operation/no-job state has continued for a predetermined period of time) (Yes in step S1305), in step S1306, the image forming apparatus 100 shifts to the power saving mode. The processing in steps S1305 and S1306 is performed by the CPU 701, for example. When the image forming apparatus 100 shifts to the power saving mode, the CPU 801 is notified of the shift.

Then, in step S1307, the CPU 801 changes the output value of the power saving switching port 992 to be low. As a result, a signal input to the interrupt port 991 of the CPU 801 is switched to the output signal of the D-type flip-flop 901.

Next, in step S1308, the CPU 801 changes the setting of the timer port 990 from the constant low state to the toggle setting by the timer function. The processing thereafter in steps S1309 to S1316 is similar to that in steps S1103 to S1110 in FIG. 11 described above and thus will not be described. After the processing in step S1315 or S1316, in step S1317, the image forming apparatus 100 shifts to the normal mode, and the processing returns to step S1302.

As described above, according to the second exemplary embodiment, when the image forming apparatus 100 is in the normal mode, a document bundle on the document tray 201 can be immediately detected after being placed, whereas when the image forming apparatus 100 is in the power saving mode, power consumed by the CPU 801 and the photointerrupter 302 can be reduced. Thus, an image processing apparatus that can achieve both high responsiveness in the normal mode and high power saving performance in the power saving mode, in addition to the advantageous effect of the first exemplary embodiment can be provided.

In the first and the second exemplary embodiments, how the document detection sensor 202 is controlled when the image forming apparatus 100 is in the power saving mode has been described. The above-described control is applicable to control of a sensor using a similar photointerrupter, to reduce power consumed by the sensor and a CPU controlling the sensor when the image forming apparatus 100 is in the power saving mode.

For example, when the ADF 102, serving as the pressing plate of the reader unit 103 illustrated in FIG. 4, is opened and the hinge unit 401 is provided with a sensor employing a photointerrupter for detecting opening/closing, similar control can be achieved. This configuration can control power consumption when the image forming apparatus 100 is in the power saving mode. Furthermore, when a user opens the ADF 102 for copying, this operation is detected without fail, to cause the CPU 801 and the image forming apparatus 100 to return to the normal mode.

In addition, through similar control, sheets placed on the manual feed tray 105 illustrated in FIG. 5B can be detected by the manual feed sheet detection unit 508, to cause the CPU 801 and the image forming apparatus 100 to return from the power saving mode to the normal mode. Furthermore, through similar control, the sheet feeding cassette 106 illustrated in FIGS. 6A and 6B being pulled out (detached from the printer engine 104) can be detected by the sheet feeding cassette opening/closing detection unit 601, to cause the CPU 801 and the image forming apparatus 100 to return from the power saving mode to the normal mode. Furthermore, through similar control, the manual feed tray 105 being opened can be detected by a sensor (not illustrated), to cause the CPU 801 and the image forming apparatus 100 to return from the power saving mode to the normal mode. These types of control can be achieved through the configuration and control of the image forming apparatus 100 according to an exemplary embodiment.

As described above, according to a third exemplary embodiment, power consumed by the CPU 801 and the above-described sensors (the sensor having a predetermined detection function such as the platen opening/closing detection sensor of the hinge unit 401 and the manual feed sheet detection unit 508) can be reduced. In other words, an image processing apparatus capable of reducing power consumed by the above-described sensors while shifting the CPU controlling the above-described sensors to the power saving state can be provided. In addition, when the image forming apparatus 100 is in the normal mode, the above-described sensors can immediately detect the opening and closing of the ADF 102 and the manual feed tray 105. When the image forming apparatus 100 is in the power saving mode, power consumed by the CPU controlling the above-described sensors and the sensors can be reduced. Thus, an image processing apparatus that can achieve both high responsiveness in the normal mode and high power saving performance in the power saving mode can be provided.

In the above-described exemplary embodiments, the driving signal 803 controlling the lighting ON/OFF of the infrared LED 806 of the photointerrupter 302 is generated by the function port (timer function or PWM function) of the CPU 801. In a fourth exemplary embodiment, description will be given of an example in which a general-purpose logic circuit or a complementary metal-oxide semiconductor (CMOS) timer integrated circuit (IC) is used to generate the signal, instead of the functions of the CPU 801.

In the present exemplary embodiment, the driving signal 803 illustrated in FIG. 9 or 12 is generated not by the timer port 990 of the CPU 801 but by a circuit independent from the CPU 801. For example, when the driving signal 803 is configured to have a toggle waveform at a constant cycle/constant duty rate through the use of combination of general-purpose logic ICs and a CMOS timer IC, the infrared LED 806 can be driven without the control of the CPU 801.

As illustrated in FIG. 12, when the image forming apparatus 100 is in the normal mode, if control is performed to drive the driving signal 803 to achieve a constant ON state, the operations illustrated in FIG. 12 can be achieved.

Furthermore, while the image processing apparatus has been described in the above-described exemplary embodiments, additional exemplary embodiments can be seen to encompass any other type of apparatus that is an electronic device for performing control using a sensor similar to the above-described sensors.

As described above, an apparatus capable of reducing power consumed by a detection unit as described above, while shifting a control unit controlling the detection unit to a power saving state can be provided.

The structures and details of various types of data are not limited to those described above. It is a matter of course that various structures and details can be employed in accordance with uses and purposes.

While exemplary embodiments have been described above, additional exemplary embodiments can be implemented in a form of a system, an apparatus, a method, a program, a storage medium, and the like for example. For example, a system including a plurality of devices or to an apparatus including a single device.

Any combination of the above-described exemplary embodiments is applicable.

Exemplary embodiments can be implemented by executing the following processing. Specifically, software (a program) for implementing the functions of the above-described exemplary embodiments may be supplied to a system or an apparatus through a network or various types of storage media, and a computer (or a CPU or a microprocessor unit (MPU)) of the system or the apparatus may read and execute the program.

The above-described exemplary embodiments are not seen to be limiting, and can be modified in various ways (including organic combinations), and the scope of the present disclosure includes such modifications.

According to an exemplary embodiment, an image processing apparatus capable of reducing power consumed by a detection unit while shifting a control unit controlling the detection unit to a power saving state can be realized. As a result, the image processing apparatus can reduce power consumed both by the control unit controlling the detection unit and by the detection unit, and the control unit can return to the original state, being triggered by the detection by the detection unit.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-040141 filed Mar. 3, 2014, which is hereby incorporated by reference herein in its entirety.

What is claimed is:

1. An information processing apparatus comprising:
a scanner unit which reads an original;
a signal output circuit which outputs a pulse signal;
a light emitting element which outputs a light if the pulse signal is in a first state and does not output the light if the pulse signal is in a second state;
a light receiving element which outputs a light reception signal based on receiving the light from the light emitting element, the light output from the light emitting element is blocked or transmitted by setting the original to be read by the scanner unit;
a processor, which includes a predetermined port and is able to be put into a first processor state and a second processor state, shifts from the second processor state to the first processor state when a predetermined voltage signal is input to the predetermined port, wherein the first processor state is a state in which power supply to the scanner unit is controllable, and the second processor state is a state in which power supply to the scanner unit is uncontrollable; and
a detection signal output circuit which receives the pulse signal and the light reception signal and outputs, based on the pulse signal and the light reception signal, a detection signal which is the predetermined voltage signal,
wherein, in response to an input of the detection signal to the predetermined port from the detection signal output circuit, the processor shifts from the second power state to the first power state and controls the power supply to the scanner unit to enable the scanner unit to operate.

2. The information processing apparatus according to claim 1, further comprising a photointerrupter which includes the light emitting element and the light receiving element.

3. The information processing apparatus according to claim 1, wherein the light emitting element and the light receiving element are disposed in such a manner that, in a case where light is output from the light emitting element to the light receiving element, the light output from the light emitting element to the light receiving element is blocked by setting the original to be read by the scanner unit.

4. The information processing apparatus according to claim 1,
wherein the detection signal output circuit is a latch circuit for latching a state of the light reception signal at a timing at which a state of the pulse signal changes, and
wherein the latch circuit outputs, to the processor, the latched state of the light reception signal as the detection signal.

5. The information processing apparatus according to claim 1, wherein, when the processor returns from the power saving state, the processor refers to a state of the detection signal and then performs return processing of setting the scanner unit into an original readable state.

6. The information processing apparatus according to claim 1,
wherein, before shifting to the power saving state, the processor sets a cycle and a duty rate of the pulse signal to be output from the signal output circuit, and
wherein the signal output circuit outputs the pulse signal at the cycle and the duty rate set by the processor.

7. The information processing apparatus according to claim 1, further comprising a light block member which blocks the light output from the light emitting element by setting the original to be read by the scanner unit.

* * * * *